US010627009B2

(12) United States Patent
Shiner

(10) Patent No.: US 10,627,009 B2
(45) Date of Patent: Apr. 21, 2020

(54) WATER SHUT-OFF VALVE TOOL

(71) Applicant: Personal and Recreational Products, Inc., Westlake, TX (US)

(72) Inventor: Timothy A. Shiner, Westlake, TX (US)

(73) Assignee: Personal and Recreational Products, Inc., Westlake, TX (US)

( * ) Notice: Subject to any disclaimer, the term of this patent is extended or adjusted under 35 U.S.C. 154(b) by 0 days.

(21) Appl. No.: 15/977,571

(22) Filed: May 11, 2018

(65) Prior Publication Data

US 2019/0346061 A1    Nov. 14, 2019

(51) Int. Cl.
| | | |
|---|---|---|
| *F16K 35/06* | (2006.01) | |
| *B25B 13/02* | (2006.01) | |
| *B25G 1/10* | (2006.01) | |
| *B25B 13/50* | (2006.01) | |
| *E03B 7/08* | (2006.01) | |

(52) U.S. Cl.
CPC .............. *F16K 35/06* (2013.01); *B25B 13/02* (2013.01); *B25B 13/50* (2013.01); *B25G 1/102* (2013.01); *E03B 7/08* (2013.01); *Y10T 137/701* (2015.04); *Y10T 137/7014* (2015.04)

(58) Field of Classification Search
CPC ................ F16K 35/06; Y10T 137/701; Y10T 137/7014; B25G 1/043; B25B 23/16
USPC ................................. 251/291, 292; 81/177.3
See application file for complete search history.

(56) References Cited

U.S. PATENT DOCUMENTS

| | | | | |
|---|---|---|---|---|
| 407,955 A | * | 7/1889 | Kallaher et al. | F16K 31/46 137/369 |
| 5,271,300 A | * | 12/1993 | Zurbuchen | B25B 13/00 81/124.4 |
| 5,327,925 A | * | 7/1994 | Ortel | E03B 9/10 137/15.08 |
| D364,542 S | | 11/1995 | Pollard | |
| 5,638,964 A | * | 6/1997 | Ernst | B25H 3/04 206/376 |
| D387,255 S | | 12/1997 | Rhoton | |
| 5,983,759 A | * | 11/1999 | Turner | B25B 13/08 81/125.1 |
| 6,044,732 A | | 4/2000 | Astle | |
| 6,364,285 B1 | | 4/2002 | Stinnett | |
| D472,777 S | | 4/2003 | Halstead | |
| 7,000,897 B2 | | 2/2006 | Chick | |
| 7,055,412 B2 | | 6/2006 | Leighton | |
| D634,595 S | | 3/2011 | Tyson | |

(Continued)

OTHER PUBLICATIONS

Martin and Martin, "LabVIEW for Automotive, Telecommunications, Semiconductor, Biomedical, and Other Applications," Prentice Hall, May 2000, pp. 29-34.

*Primary Examiner* — Kevin F Murphy
(74) *Attorney, Agent, or Firm* — Fish & Richardson P.C.

(57) ABSTRACT

A water shut-off valve tool is configured to be deposited entirely within an in-ground enclosure housing a water shut-off valve. The handle of the tool extends laterally to opposing sides of a shaft of the tool, and includes four separate finger apertures along its lateral extent. Each finger aperture is configured to receive a different one of a user's fingers. The handle includes four, converging arched portions. An exterior of each arched portion defines a partial arch on an outer edge of the handle and an interior of each arched portion defines a perimeter of a different one of the finger apertures.

20 Claims, 4 Drawing Sheets

(56) References Cited

U.S. PATENT DOCUMENTS

| | | | |
|---|---|---|---|
| 8,091,571 B2* | 1/2012 | Weisz | B25B 13/48 |
| | | | 137/1 |
| D742,956 S | 11/2015 | Klinger | |
| D743,222 S | 11/2015 | Smith | |
| D774,992 S | 12/2016 | Hill | |
| D776,024 S | 1/2017 | Jordan | |
| D805,862 S | 12/2017 | Blackmon | |
| 2004/0217316 A1 | 11/2004 | Price | |
| 2005/0139042 A1 | 6/2005 | Leighton | |
| 2006/0011881 A1* | 1/2006 | Leighton | B25B 13/06 |
| | | | 251/291 |
| 2007/0028727 A1* | 2/2007 | Schiller | B25B 13/14 |
| | | | 81/177.3 |
| 2015/0165601 A1 | 6/2015 | Braude | |

* cited by examiner

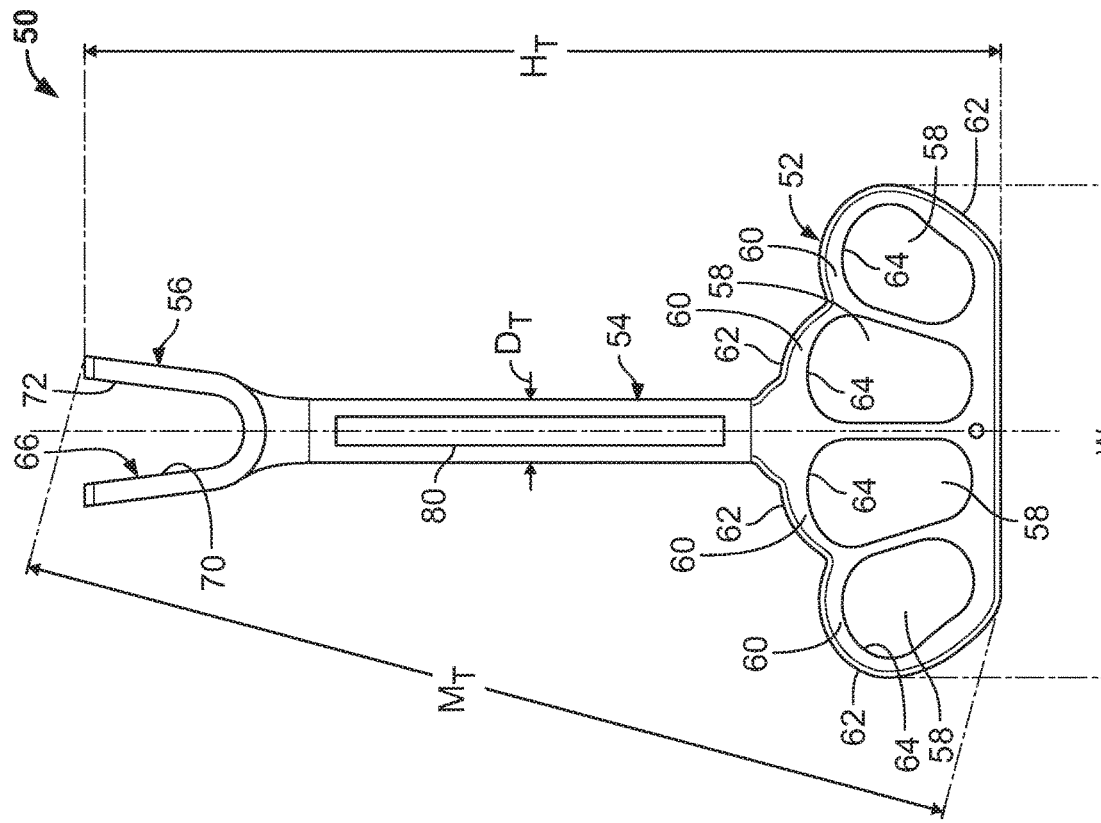
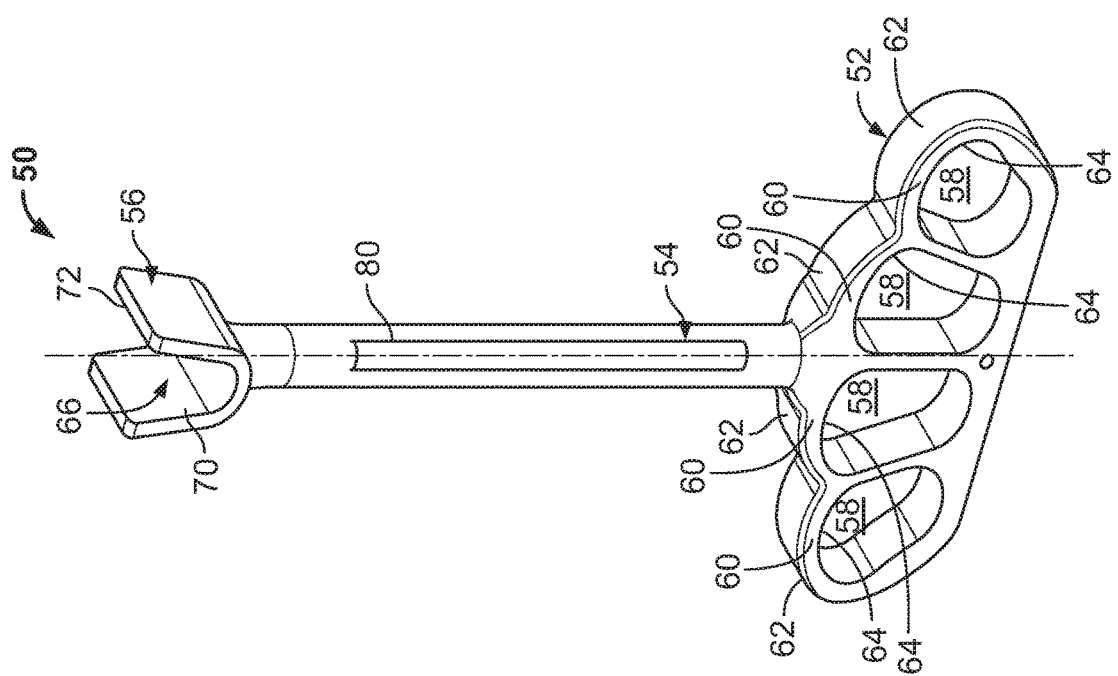

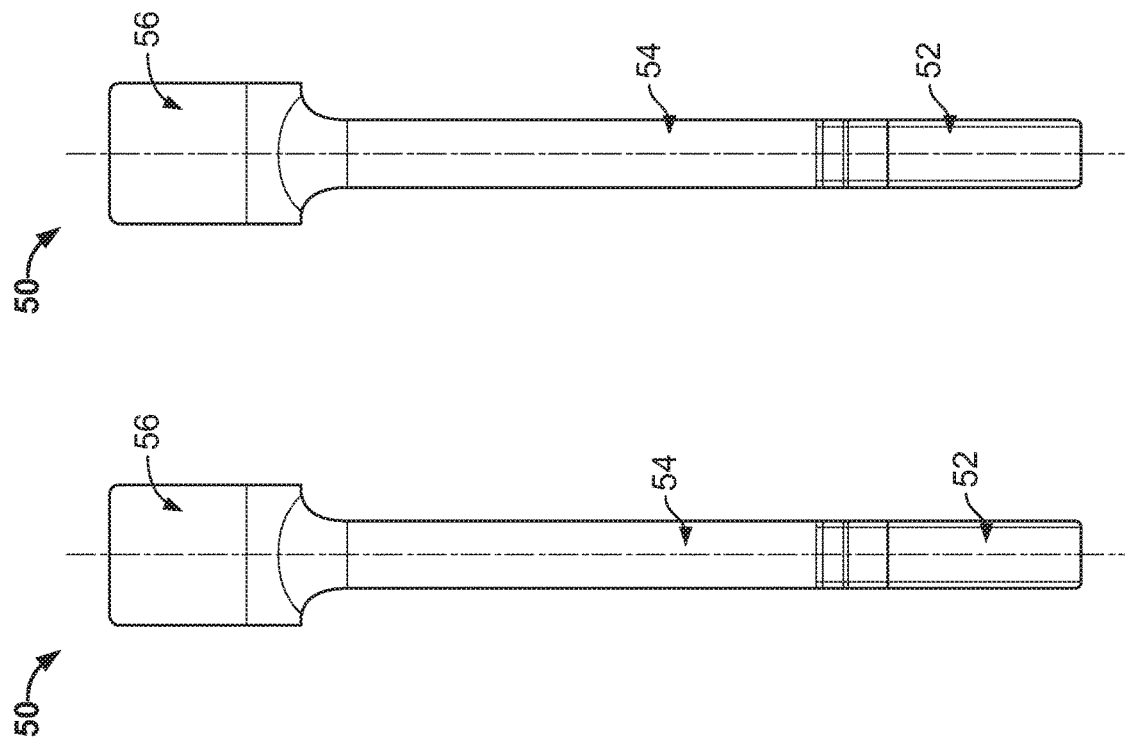
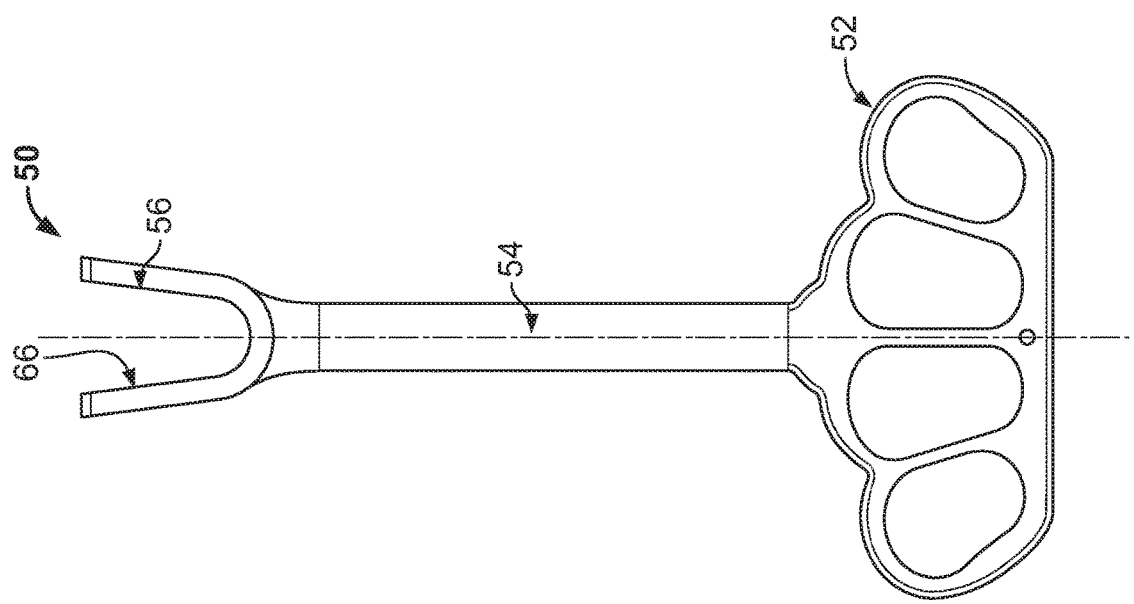

WATER SHUT-OFF VALVE TOOL

BACKGROUND

Buildings, both residential and businesses, have a main water shut-off valve that gates flow from a source of water supply to the premises. In buildings that receive water from the municipality, that valve gates water from the municipal water supply to the premises and defines the boundary between water lines maintained by the municipality and water lines maintained by the premises owner. The valve, when open, allows flow of water from the water supply to the premises, building included. The valve, when shut, stops flow of water from the water supply to the premises. Often, the water shut-off valve is the sole source of water supplied to the premises, so shutting off the valve will shut-off all water supplied to the premises.

In an urgent situation, such as a leak or rupture of a water line within the building, shutting the water shut-off valve quickly is critical in reducing damage to the structure. Water shut-off valves are often provided without a handle, and thus require a special tool to operate. Because the needed tool is rarely used, and particularly for residences and businesses without on-site facilities maintenance personnel, the tool is not at the ready, either lost or stored in an inconvenient location.

DESCRIPTION OF DRAWINGS

FIGS. 3A-3G depict a water shut-off valve tool constructed in accordance with the concepts herein. FIG. 3A is a front, top perspective view of the water shut-off valve tool. FIG. 3B is a front view of the tool. FIG. 3C is a back view of the tool. FIGS. 3D and 3E are left and right side views, respectively, of the tool. FIG. 3F is top view of the tool, looking into the tool tip. FIG. 3G is a bottom view of the tool, looking into the handle.

Like reference symbols in the various drawings indicate like elements. The figures are proportionally to scale. Other dimensions and proportions are within the concepts herein.

DETAILED DESCRIPTION

Figure 1:
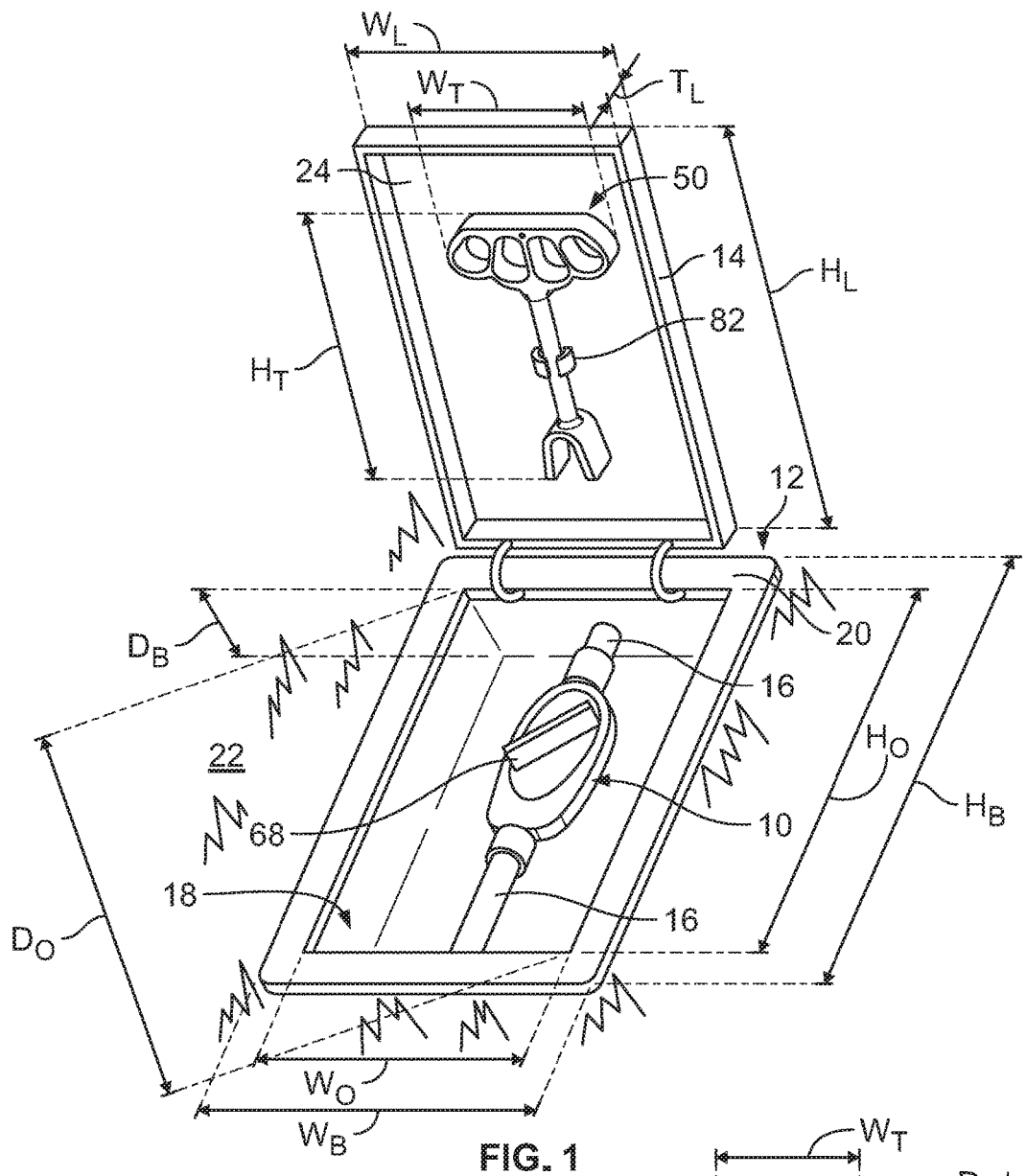
FIG. 1 is a perspective view of a water shut-off valve in a in-ground enclosure with a water shut-off valve tool, the tool being constructed in accordance with the concepts herein.

FIG. 1 shows a water shut-off valve 10, for example, the shut-off valve that gates flow of water from a water supply to a premises. In buildings that receive water from the municipality, the valve 10 gates water from the municipal water supply to the premises and defines the boundary between water lines maintained by the municipality and water lines maintained by the premises owner (i.e., not the municipality). Often the water shut-off valve 10 is the main valve from the sole source of water supplied to the premises, so shutting off the valve will shut-off all water supplied to the premises.

The valve 10 resides in an in-ground enclosure 12, shown with the lid 14 of the enclosure open. Here the valve 10 is shown alone in the enclosure, with the incoming and outgoing pipes 16, but sometimes the valve 10 will share the enclosure 12 with a water meter or other components (not shown). Typically, the enclosure 12 is of a type provided by or specified by a municipality for housing a valve 10. Also, notably, FIG. 1 is but one example. The valve 10 and enclosure 12 can be virtually any conventional configuration or heretofore new configuration.

Figure 2:
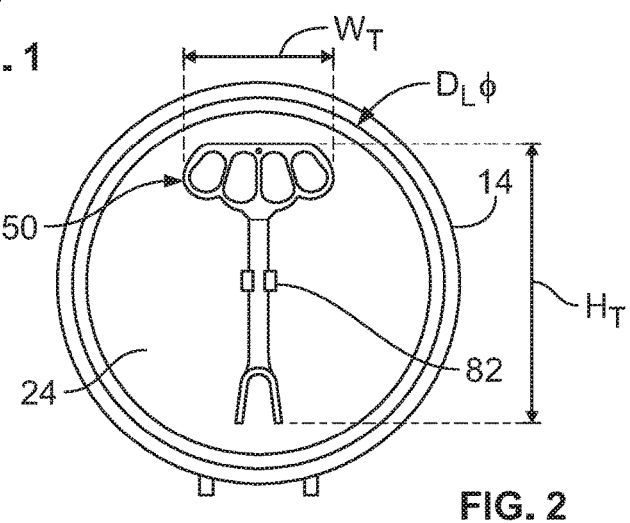
FIG. 2 is a perspective view of a lid for a cylindrical in-ground enclosure with a water shut-off valve tool, the tool being constructed in accordance with the concepts herein.
Figure 3F:
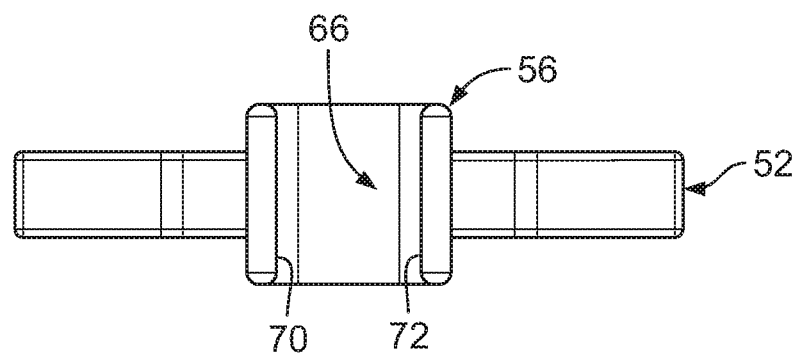
Figure 3G:
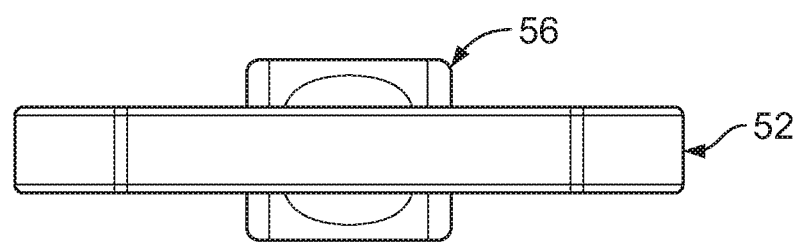

The enclosure 12 in FIG. 1 is shown as being generally a rectangular cuboid, with a rectangular lid 14 and opening 18. The lid 14, when closed, sits flush (approximately or precisely) with the top surface 20 of the enclosure 12. The top surface 20 of the enclosure 12 and lid 14, when closed, will then sit flush (approximately or precisely) with the surrounding ground 22. The lid 14 is shown as a type that fits over the top surface 20 of the enclosure 12 and thus may have exterior dimensions (height, width and maximum dimension) larger than corresponding dimensions of the opening 18. The lid 14 is a flat plate or, as depicted in FIG. 1, is shaped with a central recessed area 24 on the opening-facing surface. Also, the enclosure 12 need not be rectangular or even square, but can be another shape. Often the enclosure 12 is cylindrical. FIG. 2 shows the inside of a cylindrical lid 14 for a cylindrical enclosure. Other shapes of lids 14 are within the concepts herein.

A water shut-off valve tool 50 constructed in accordance with the concepts herein is configured to fit entirely within the enclosure 12 that houses the valve 10. Doing so, allows the tool 50 to be stored in the enclosure 12 when not in use. Thus, the tool 50 is always available at the location where it will be used, and no time is wasted in finding the tool 50 and shutting off the water in urgent circumstances, such as a leak or rupture at the premises. The tool 50 can be marked with instructions indicating that the tool 50 is to be stored in the enclosure 12 when not in use. The tool 50 can be packaged with instructions or the packaging printed to include instructions indicating that the tool 50 is to be stored in the enclosure 12 when not in use.

Referring to FIGS. 3A-3G the water shut-off valve tool 50 is shown in detail. The tool 50 has a handle 52, a shaft 54 extending from the handle 52 and a tool tip 56 at the end of the shaft 54 opposite the handle 52. The handle 52 provides a grip that allows a human user to grip the tool 50 to operate tool 50, and thus the valve 10. The tool tip 56 is configured to engage and operate the valve 10 between open and closed as the tool 50 is being turned by the user.

The shaft 54 is long and narrow and extends in or parallel to a center axis (shown in the figures by a center line) of the tool 50. The shaft 54 spaces the handle 52 from the tool tip 56. The handle 52 extends laterally to opposing sides of the shaft 54, overhanging the shaft 54. The handle 52 has four separate finger apertures 58 along its lateral extent, each finger aperture 58 is configured, for example in its spacing and aperture size, to receive a different one of a user's fingers. In certain instances, the handle 52 is defined by four, converging arched portions 60. The arched portions 60 can be formed in a number of different ways, including by molding material directly into an arched shape, by forming (e.g., bending, forging or otherwise) bar material into an arched shape and attaching the material together, or in another manner. An exterior of each arched portion 60 defines a partial arch on an outer edge 62 of the handle 52. An interior of each arched portion defines a perimeter 64 of a different one of the finger apertures 58. In certain instances, the arched portions 60 can be arranged to define a shape that resembles a weapon known as "brass knuckles." The configuration shown in the figures is such a "brass knuckles" looking arrangement.

The tool tip 56 has a profile 66 configured to engage a corresponding profile 68 on the water shut-off valve 10 (FIG. 1). The valve's profile 68 resides on the component of the valve 10 that moves the internal valve closure (not shown) to its open (allowing flow) and closed (sealing against flow) positions. While other configurations of tool tips 56 and valve profile 68 are within the concepts herein, in certain instances, the valve's profile 68 is as shown in the figures with an upstanding, male ridge that is longer than it is wide or tall. Thus, the tool tip profile 66 is a female profile with two opposing and opposing planar surfaces 70, 72 defining a channel therebetween to receive the valve's male profile 68. The opposing planar surfaces 70, 72 receive the ridge of the valve's male profile 68 through an opening at the end-facing portion of the tool tip 56 to reside adjacent and abut the opposing sides of male ridge. The surfaces 70, 72 abutting the ridge transmit torque to the ridge when the tool 50 is turned.

In certain instances, the tool 50 is made of metal, plastic, a combination of the two, or of other materials. In certain instances, the tool tip 56 is formed as unitary piece of bar, bent into a U-shape. In certain instances, the entire tool 50 is formed as a unitary injection molding of plastic. If metal or partially metal, the metal can be steel with an anti-corrosion treatment (e.g., paint, galvanizing, or other), a corrosion resistant metal (e.g., aluminum alloys, zinc alloys, or other), or another metal.

The tool 50 can be marked in a marking area 80 with a logo, word mark or other type of mark corresponding to the manufacturer or corresponding to a third party, unassociated with the manufacturer (e.g., an advertisement). For example, the tool 50 bearing a third party's marking can be sold to the third party for distribution as a promotional product (i.e., advertising by the third party) or sold by the third party as a "private label" product. The instructions to store the tool 50 in the enclosure 12 can also be provided in the marking area 80. Although shown on the shaft 54, the marking area 80 can be elsewhere on the tool 50 and multiple marking areas 80, with the same marking or different markings, can be provided.

Both FIG. 1 and FIG. 2 show the tool 50 carried on the opening facing surface of the lid 14. Thus, when the lid 14 is closed, the tool 50 is positioned inside the enclosure. In other instances, the tool 50 can be simply placed in the enclosure 12 when not in use or it can be carried by another portion of the enclosure 12 (e.g., by a sidewall, bottom wall or other). The tool 50 is shown supported via a clip 82 affixed to the lid 14. In certain instances, the clip 82 is a spring clip that is biased to grip the shaft 54 (or other part) of the tool 50 to hold it to the lid 14, and can elastically flex outward to receive and release tool 50. The springiness of the clip 82 is selected to allow receipt and release of the tool 50 without use of other tools, so the tool 50 can be readily removed from the enclosure 12 by the user with his or her bare hands. In certain instances, the clip 82 is a latch that can receive and release the tool 50, again without use of other tools. In certain instances, the clip 82 is magnetic to magnetically attach to and hold a steel tool 50. Other types of clips are within the concepts herein.

As discussed, above, the tool 50 is configured to fit within the enclosure 12. The opening 18 has a maximum height ($H_O$), a maximum width ($W_O$) and a maximum opening dimension. In the case of the rectangular cuboid enclosure of FIG. 1, the maximum opening dimension is the maximum diagonal dimension ($D_O$). In the case of a cylindrical enclosure 12, the maximum opening dimension is the maximum diameter ($D_O$) of the opening. The maximum dimension of the tool 50 measured parallel to the center axis ($M_T$), in this case measured at a diagonal between the tool tip 56 and the handle 52 in a plane parallel with a surface of the tool, is less than the maximum opening dimension to allow the tool 50 to pass through the opening 18. In other configurations, the maximum dimension of the tool 50 may be different. In certain instances, the maximum width ($W_T$) of the tool and maximum length ($L_T$) of the tool 50 is also less than the corresponding width ($W_O$) and height ($H_O$) of the opening 18 and the depth ($D_B$) of the enclosure 12. The other dimensions of the tool 50 are also sized to facilitate placing the tool 50 within the enclosure 12, while accounting for space taken up by the valve 10 itself and the other plumbing and components in the enclosure 12. Typical rectangular cubic enclosures have dimensions—12 to 30 inches maximum opening height ($H_O$), 10 to 24 inches maximum opening width ($W_O$), 12 to 24 inches maximum depth ($D_B$), and 15 to 31 maximum opening dimension ($D_O$). Typical cylindrical enclosures have dimensions—13 to 30 inches maximum opening diameter ($D_O$) and 12 to 30 inches maximum depth ($D_B$). In certain instances, the tool 50 has a maximum width ($W_T$) of 4.5 inches, a maximum length ($L_T$) of 8.5 inches, a maximum thickness ($D_T$) of 0.5 inches and a maximum dimension ($M_T$) of 8.0 inches. In certain instances, one or more of these dimensions can be varied by approximately 0.25 inches, 0.5 inches or 1.0 inches. In certain instances, the maximum dimension ($M_T$) is 12.0 inches or less.

The handle 52 is also wide to provide leverage for a user to operate the valve 10. For example, the shaft 54 has a thickness ($D_T$), and the maximum width ($W_T$) of the tool 50 is at the handle 52 and is much larger than the shaft 54 thickness ($D_T$).

If the tool 50 is carried on the lid 14, the tool 50 can also be configured to fit within a recessed area 24 or, if no recessed area a flat area, of the lid 14. FIG. 1 shows a lid 14 with a recessed area 24 having a maximum height dimension ($H_L$) and a maximum width dimension ($W_L$). On the cylindrical lid 14 shown in FIG. 2, the recessed area 24, or the flat area of the cylindrical lid 14, has a maximum diameter ($D_L$). The recessed area 24, if provided, has a minimum depth ($T_L$) of the portion of the recessed area receiving the tool 50. In certain instances, the tool 50 may have a thickness ($T_T$), measured perpendicular to the maximum width ($W_T$) that is equal to or less than the minimum depth ($T_L$) of the recessed area 24.

In use, a user receives the water shut-off valve tool 50, and deposits the tool 50 within the enclosure 12. The tool 50 is configured to be put entirely within enclosure 12, so that no portion of the tool 50 need extend out of the enclosure 12 and the lid 14 of the enclosure 12 can be closed, placed securely and completely over the opening into the enclosure12 as it would do if no tool 50 were in the enclosure 12. In certain instances, the tool 50 can come with instructions or its packaging be printed with instructions or the tool 50, itself, can be printed with instructions instructing the user to deposit and store the tool 50 in the enclosure 12. In such a case, the user would read the instructions and be motivated to deposit and store the tool 50 in the enclosure 12.

Thereafter, when the water shut-off valve 10 needs to be operated, for example to cease flow of water to the premises or turn water on at a premises, the user then opens the lid 14 of the enclosure 12 and retrieves the tool 50 from the enclosure 12. The user grips the handle 52 of the tool 50, placing a different finger in each of the separate finger apertures 58. The tool tip 56 is guided to the valve 10 and positioned with the male profile 68 of the valve 10 received into the female channel profile 66 of the tool tip 56, engaging the tool tip 56 with the male profile 68 of the valve 10. The user then applies torque to the tool 50 via the handle 52, rotating the tool 50, and thus the valve closure to operate the valve 10 between open and closed. Thereafter, the water shut-off tool 50 is deposited back into the enclosure 12 and the lid 14 of the enclosure 12 closed, secured over the opening.

A number of embodiments of the invention have been described. Nevertheless, it will be understood that various modifications may be made. Accordingly, other embodiments are within the scope of the following claims.

What is claimed is:

1. A method, comprising:
   receiving a water shut-off valve tool, the tool comprising:
   a handle;
   an elongate shaft extending from the handle, and
   a tool tip at the end of the shaft, the tool tip comprising a water shut-off valve engaging profile, the profile configured to engage and turn a profile of the valve and operate the valve between open and closed as the tool is being turned; and
   depositing the water shut-off valve tool entirely within an in-ground enclosure housing a water shut-off valve with the shaft extending laterally between opposing sides of the enclosure, where the water shut-off valve tool is deposited with the longest dimension of the shaft extending horizontally.

2. The method of claim 1, where the handle extends laterally to opposing sides of the shaft and comprises four separate, isolated, finger apertures along its lateral extent; and
   comprising gripping the handle by placing a different finger in each of the separate, isolated finger apertures.

3. The method of claim 1, comprising positioning a lid of the enclosure over an opening into the enclosure while the tool is in an interior of the enclosure.

4. The method of claim 1, comprising:
   withdrawing the tool entirely from within an interior of the enclosure; and
   operating the valve with the tool.

5. The method of claim 1, comprising inserting a male profile of the valve into a female channel of the tool tip, engaging the tool tip with the male profile of the valve; and
   rotating the tool to operate the valve between open and closed.

6. The method of claim 1, comprising, retaining the water shut-off valve tool to a lid of the enclosure.

7. The method of claim 1, where depositing the water shut-off valve tool entirely within an in-ground enclosure housing a water shut-off valve comprises depositing the water shut-off valve tool entirely within an in-ground enclosure housing a water shut-off valve between a municipal water supply and a business or residential premises.

8. A method, comprising:
   withdrawing a water shut-off valve tool residing entirely within an in-ground enclosure housing a water shut-off valve from the enclosure, where the water shut-off valve tool is withdrawn from a position with the longest dimension of an elongate shaft extending laterally, the water shut-off valve tool comprising:
   a handle,
   the elongate shaft extending from the handle, and
   a tool tip at the end of the shaft, the tool tip comprising a water shut-off valve engaging profile, the profile configured to engage and turn a profile of the valve and operate the valve between open and closed as the tool is being turned; and
   operating the valve with the tool.

9. The method of claim 8, comprising depositing the water shut-off valve tool entirely within the in-ground enclosure.

10. The method of claim 8, where the handle extends laterally to opposing sides of the shaft and comprises four separate, isolated finger apertures along its lateral extent; and
    comprising gripping the handle by placing a different finger in each of the separate, isolated finger apertures.

11. The method of claim 8, comprising positioning a lid of the enclosure over an opening into the enclosure while the tool is in an interior of the enclosure.

12. A water shut-off valve tool system for residing in an in-ground enclosure housing a municipal water shut-off valve, comprising:
    a handle;
    a shaft extending from the handle; and
    a tool tip at the end of the shaft, the tool tip comprising a water shut-off valve engaging profile, the profile configured to engage and turn a profile of the valve and operate the valve between open and closed as the tool is being turned,
    the largest dimension between the handle and tool tip being 12 inches or less, the water shut-off valve tool system being sized to be stored with the longest dimension of the shaft extending laterally within the in-ground enclosure housing.

13. The water shut-off valve tool system of claim 12, where the handle extends laterally to opposing sides of the shaft and comprises four separate, isolated finger apertures along its lateral extent, each finger aperture configured to receive a different one of a user's fingers.

14. The water shut-off valve tool of claim 13, where the handle comprises four, converging arched portions, an exterior of each arched portion defining a partial arch on an outer edge of the handle and an interior of each arched portion defining a perimeter of a different one of the finger apertures.

15. The water shut-off valve tool system of claim 12, comprising an instruction, located on the tool or with a tool packaging, to store the water shut-off valve tool in the enclosure.

16. The water shut-off valve tool system of claim 12, comprising a clip configured to affix to the enclosure and configured to grip the shaft and support the handle, shaft and tool tip from the enclosure and to enable tool-free release of the shaft from the clip.

17. The water shut-off valve tool system of claim 16, where the clip is a spring clip configured to affix to a lid of the enclosure.

18. The water shut-off valve tool system of claim 12, where the valve engaging profile is a female profile comprising two opposing and opposing planar surfaces defining a male valve profile receiving channel.

19. The water shut-off valve tool system of claim 12, where the handle, the shaft and the tool tip are formed as a unitary, plastic injection molding.

20. The water shut-off valve tool system of claim 12, where the handle, the shaft and the tool tip are metal comprising an anti-corrosion treatment.

* * * * *

UNITED STATES PATENT AND TRADEMARK OFFICE
CERTIFICATE OF CORRECTION

PATENT NO. : 10,627,009 B2
APPLICATION NO. : 15/977571
DATED : April 21, 2020
INVENTOR(S) : Timothy A. Shiner Page 1 of 1

It is certified that error appears in the above-identified patent and that said Letters Patent is hereby corrected as shown below:

In the Claims

Column 6, Line 35, Claim 14, after "tool" insert -- system --.

Signed and Sealed this
First Day of September, 2020

Andrei Iancu
*Director of the United States Patent and Trademark Office*